(No Model.)  2 Sheets—Sheet 1.

W. M. WILDER.
COTTON SEED PLANTER.

No. 315,099.  Patented Apr. 7, 1885.

Witnesses:

Inventor
William M. Wilder
per H. Harrison
Attorney (No Model.) 2 Sheets—Sheet 2.
W. M. WILDER.
COTTON SEED PLANTER.
No. 315,099. Patented Apr. 7, 1885.
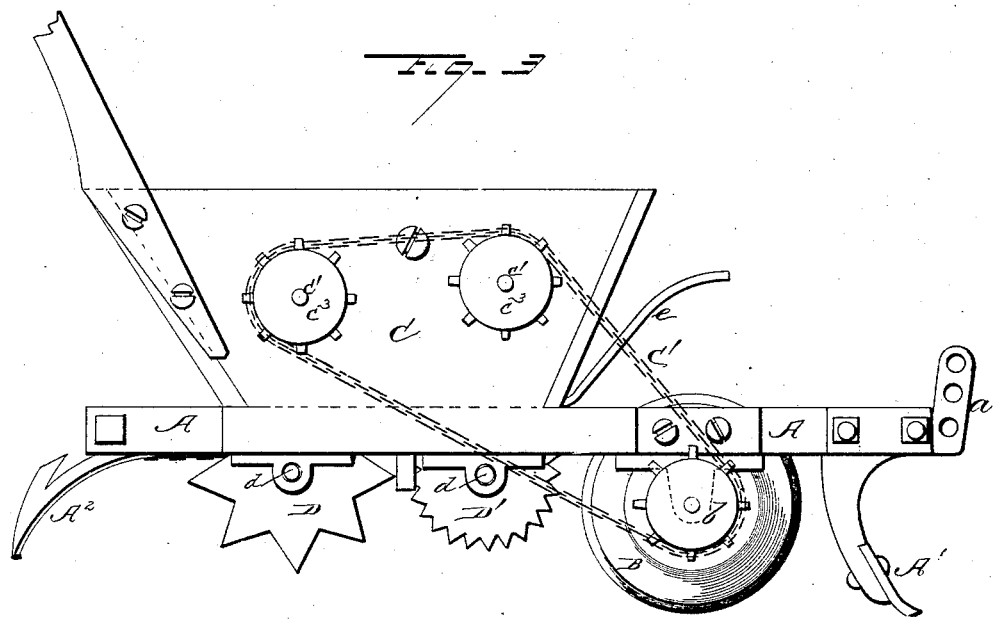
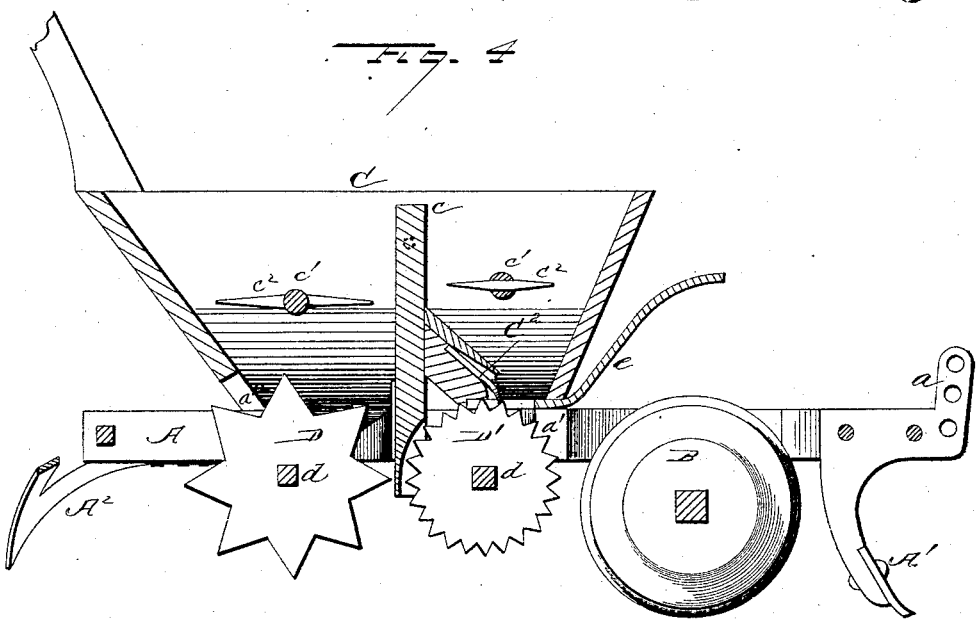

UNITED STATES PATENT OFFICE.

WILLIAM MONROE WILDER, OF FRANKLIN, GEORGIA.

COTTON-SEED PLANTER.

SPECIFICATION forming part of Letters Patent No. 315,099, dated April 7, 1885.

Application filed May 6, 1884. (No model.)

*To all whom it may concern:*

Be it known that I, WILLIAM M. WILDER, a citizen of the United States, residing at Franklin, in the county of Heard and State of Georgia, have invented certain new and useful Improvements in Cotton-Seed Planters, of which the following is a specification, to wit:

This invention relates to cotton-planters; and it consists in certain peculiarities of construction and arrangement of the same, substantially as will be hereinafter more fully set forth, and pointed out in the claims.

In order to enable others skilled in the art to which my invention appertains to make and use the same, I will now proceed to describe its construction and arrangement, referring to the accompanying drawings, in which—

Figure 1:
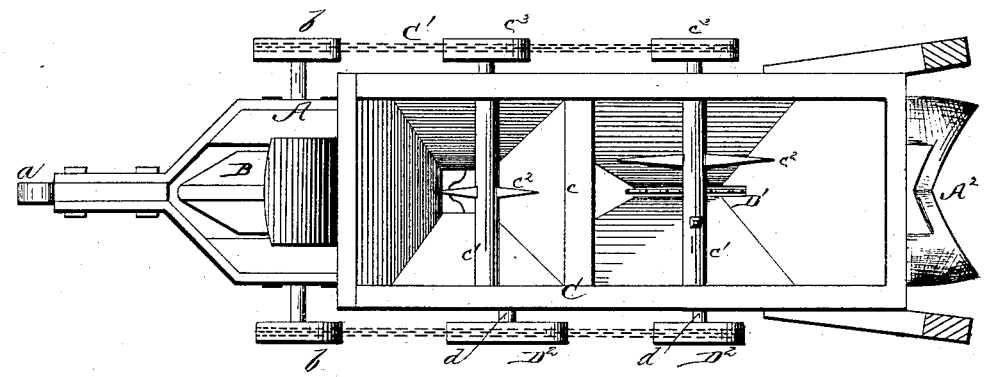
Figure 2:
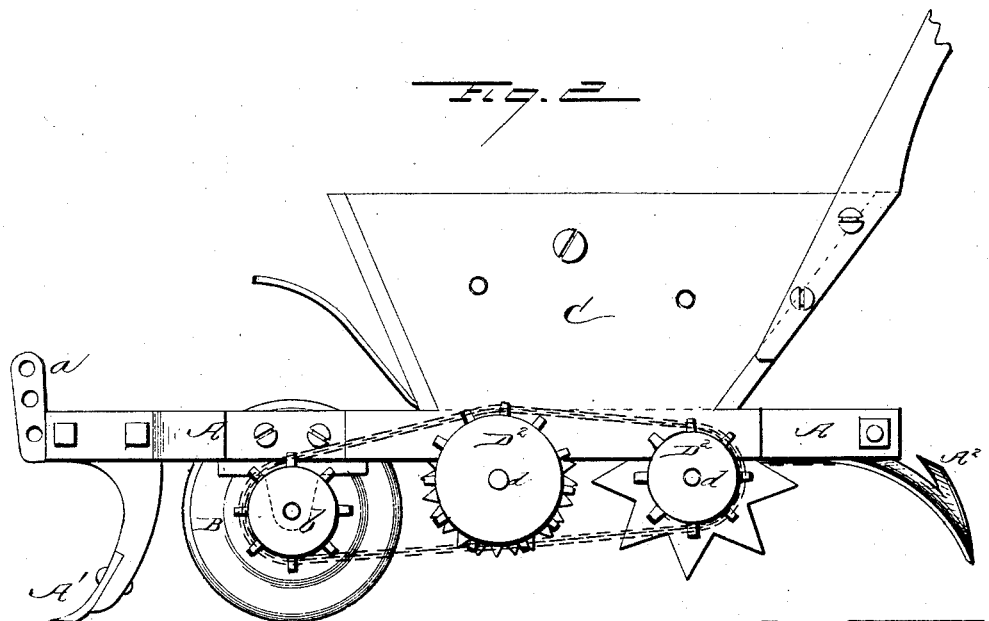

Figure 1 is a plan view. Figs. 2 and 3 are reverse side elevations of the device; and Fig. 4 is a longitudinal vertical section of the same.

A represents the frame of my machine, provided at its forward end with a clevis, $a$, for attachment of the team, and an opener or shovel, A', and in the rear with a cover, A², adapted to turn in the earth and cover the seed after planting.

Just in rear of the opener A' is journaled a furrow-wheel, B, having a V-shaped edge, and upon its axle outside the frame on each side is placed a sprocket or chain wheel, $b\ b$.

Upon the frame A is secured a box, C, divided into two compartments or hoppers by a partition, $c$, which is pivoted near its upper end, as shown by dotted lines in Fig. 4; and each hopper is provided with a transverse shaft, $c'\ c'$, having arms $c^2$ to stir and loosen the material. These shafts extend through the sides of the box, in which they are journaled, and are each provided with a sprocket-wheel, $c^3$, operated by a chain or belt, C', from one of the wheels $b$ upon the axle of the main driving or furrow wheel.

Below the main frame, in suitable supports or boxes, are journaled the two saw or planting wheels D D', one of which projects upward into each of the hoppers, as shown, and serves to feed out the contents through a narrow slot or opening, $a'$, in the bottom of the box. The shafts $d$ of these wheels are also provided with chain-wheels D², operated by a belt from the main furrow-wheel, as in Fig. 2.

The forward side of the vibrating partition $c$ is provided with a spring-arm, C², which bears upon and is moved by the teeth of the saw-wheel D', and serves to more effectually feed out or stir the contents of the forward hopper, which is intended to contain guano or other fertilizer. The fertilizer-box is also provided with a slide, $e$, which enters longitudinally just over the opening $a'$, and serves to regulate the size of this opening, as may be desired.

In operation the forward motion of the machine causes the opener to form a furrow which is pressed open by the V-shaped wheel following, and into this is dropped the fertilizer and cotton-seed and covered by the part A². The stirrers and the vibrating division-piece serve to keep the contents of the boxes always loose and free to be fed out as desired.

Having thus fully described my invention, what I claim as new, and desire to secure by Letters Patent, is—

1. In a cotton-seed planter, a box provided with a vibrating partition, in combination with a toothed or saw shaped feed-wheel adapted to engage and actuate the partition, substantially as shown and described.

2. In a cotton-seed planter, a fertilizer-box having a vibrating side or end and suitable revolving stirring-arms, in combination with a slide adapted to regulate the quantity of fertilizer sown, and a saw or toothed wheel adapted to vibrate the side of box, substantially as shown and described.

3. The box C, divided by the swinging partition $c$, having a spring-arm, C², in combination with the toothed wheel D', substantially as and for the purpose set forth.

4. In a cotton-planter, the main frame A, provided with the opener A' and coverer A², the driving-wheel B, having the chain-wheels $b\ b$, and box C, in combination with the stirrers $c'\ c^2$, carrying-wheels $c^3$, the chains C', and the vibrating partition $c$ and saw-wheels D D', substantially as and for the purpose set forth.

In testimony whereof I affix my signature in presence of witnesses.

WILLIAM MONROE WILDER.

Witnesses:
L. T. LANE,
J. B. MERRILL,
W. B. CHAPMAN.